(12) United States Patent
Hirasawa et al.

(10) Patent No.: US 8,180,111 B2
(45) Date of Patent: May 15, 2012

(54) COMPOUND EYE TYPE IMAGING APPARATUS WITH DISTANCE MEASURING CAPABILITY

(75) Inventors: Taku Hirasawa, Kyoto (JP); Jyunpei Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 612 days.

(21) Appl. No.: 12/438,698

(22) PCT Filed: Jul. 10, 2008

(86) PCT No.: PCT/JP2008/001861
§ 371 (c)(1),
(2), (4) Date: Feb. 24, 2009

(87) PCT Pub. No.: WO2009/013866
PCT Pub. Date: Jan. 29, 2009

(65) Prior Publication Data
US 2010/0246892 A1    Sep. 30, 2010

(30) Foreign Application Priority Data
Jul. 23, 2007  (JP) .................. 2007-191179

(51) Int. Cl.
*G06K 9/00* (2006.01)
(52) U.S. Cl. ...................................... 382/106
(58) Field of Classification Search .......... None
See application file for complete search history.

(56) References Cited

U.S. PATENT DOCUMENTS

| | | |
|---|---|---|
| 2002/0176066 A1 | 11/2002 | Nakagawa |
| 2003/0086013 A1 | 5/2003 | Aratani |

FOREIGN PATENT DOCUMENTS

| | | |
|---|---|---|
| JP | 2-280102 | 11/1990 |
| JP | 7-154663 | 6/1995 |
| JP | 2000-352663 | 12/2000 |
| JP | 2001-004809 | 1/2001 |
| JP | 2002-350129 | 12/2002 |
| JP | 2003-143459 | 5/2003 |
| JP | 2003-207711 | 7/2003 |
| JP | 2003-215434 | 7/2003 |
| JP | 2004-333565 | 11/2004 |

*Primary Examiner* — Brian P Werner
*Assistant Examiner* — Elisa Rice
(74) *Attorney, Agent, or Firm* — Hamre, Schumann, Mueller & Larson, P.C.

(57) ABSTRACT

Multiple imaging areas (101a, 101b) are disposed in a one-to-one relationship with multiple optical lenses (100a, 100b) disposed in a substantially coplanar alignment. A baffle wall (110) interposed between the multiple imaging areas is provided with means for diffusively reflecting incident light rays. Low frequency components are removed from the spatial frequencies of multiple images captured in the multiple imaging areas, whereupon the multiple images are compared to determine the amount of parallax and measure the distance to the object. This allows for preventing degradation in the accuracy of distance measurement when light rays emanating from a high-intensity object located outside of the field angle are reflected from the baffle wall and impinge on the imaging area.

11 Claims, 10 Drawing Sheets

COMPOUND EYE TYPE IMAGING APPARATUS WITH DISTANCE MEASURING CAPABILITY

TECHNICAL FIELD

The present invention relates to a compact, low-profile compound eye type imaging apparatus with distance measuring capability. In particular, it relates to a compound eye type imaging apparatus that captures images and measures distances to objects using multiple optical imaging lenses.

BACKGROUND ART

When an image of an object is captured through multiple lenses with different optical axes, the location in which the object image is formed shifts between multiple captured images, depending on the object distance. This shift is called "parallax". The distance to the object can be measured if this parallax can be obtained from multiple captured images. Attempts have been made at utilizing imaging apparatuses with distance measuring capability based on this principle for exterior monitoring, forward monitoring, and passenger monitoring, etc. onboard vehicles and in robots, as well as for automatic control and safety technology.

Stereo cameras heretofore have been developed, in which two cameras with different optical axes are secured to a frame etc., two images are captured, and these two images are used to measure the distance to an object. Typically the method used to obtain a parallax from two captured images consists in dividing one of the two captured images into multiple blocks, retrieving the locations of blocks corresponding to each of the blocks in the other image, determining the amount of shift between the two images on a block-by-block basis, and using the amount of shift as the amount of parallax. In this method, distance measurement errors are generated if certain differences between the two images occur as a result of factors other than parallax.

In addition to parallax, factors that produce differences between the two images include errors in the mounting of the two cameras. For instance, the resultant parallax varies and errors are introduced into object distances depending on the relative relationship between the optical axes of the two cameras. Therefore, it is important to secure the two cameras to the frame, etc. with accuracy.

In order to reduce problems related to camera mounting accuracy, it is known to use a compound eye type imaging apparatus with distance measuring capability combining multiple lenses and imaging elements and permitting further miniaturization (e.g. see Patent Document 1 and Patent Document 2).

FIG. 10 shows an outline of the configuration, as well as the image processing path, of a conventional compound eye type imaging apparatus with distance measuring capability. This imaging apparatus includes a lens array 100, which is made up of two lenses 100a, 100b disposed in a substantially coplanar alignment such that their optical axes are mutually parallel, and two imaging areas 101a, 101b respectively corresponding to the two lenses 100a, 100b. The two imaging areas 101a, 101b are obtained by dividing the light-receiving region of a single shared imaging element. A lens barrel 102 shields the two optical paths between the lenses 100a, 100b and imaging areas 101a, 101b from the outside environment so as to prevent light rays that do not pass through the two lenses 100a, 100b from being incident on the imaging areas 101a, 101b. Moreover, a baffle wall 150 is interposed between the two optical paths in order to prevent light rays passing through either one of the lenses 100a, 100b from being incident on the imaging area among the imaging areas 101a, 101b that does not correspond to the above-mentioned lens.

This imaging apparatus can reduce the degradation in distance measurement accuracy caused by errors in the mounting of the two optical systems, which occurred in conventional stereo cameras, by molding the two lenses 100a, 100b integrally as a lens array 100 and creating two imaging areas 101a, 101b by dividing the light-receiving region of a single imaging element. Moreover, the provision of the baffle wall 150 between the lenses 100a, 100b allows for disposing the lenses 100a, 100b in such close proximity that their respective imaging areas overlap, thereby allowing for compact, inexpensive imaging elements to be used.

In such a compound eye type imaging apparatus, the imaging areas 101a, 101b capture two images and the parallax amount derivation means 106 determines the amount of parallax from the two images. The parallax amount derivation means 106 is composed of a block division unit 107, which divides one of the two images into multiple blocks, and a corresponding location retrieval unit 108, which retrieves the locations of blocks corresponding to each of the blocks in the other image.

The method used by the parallax amount derivation means 106 for computing the amount of parallax will be explained in detail with reference to FIG. 11.

In FIG. 11, the reference numeral 400a designates an image captured by the imaging area 101a and 400b designates an image captured by the imaging area 101b. The images 400a, 400b are aggregates of intensity information related to multiple pixels disposed in a matrix layout in the X-axis direction (horizontal direction) and Y-axis direction (vertical direction), respectively. The image 400a serves as a reference image. This image 400a is divided into multiple blocks. Each block contains a predetermined number of pixels. The reference numeral 401a designates one of the multiple blocks produced by the division. The image 400b serves as a comparison image, and a block 401b, which has the same size as the above-mentioned block 401a, is provided inside this image 400b. A two-dot chain line 401b' indicates the location of a block whose X-coordinate values and Y-coordinate values are the same as those of the block 401a, and is a reference location of the block 401b corresponding to the block 401a. In the comparison image 400b, the location of the block 401b is displaced relative to the reference location 401b' in the X-direction and Y-direction and a difference (i.e. correlation) between the image in the block 401a and the image in the block 401b is obtained for each location of the block 401b. The amount of displacement in the X-direction, m, and the amount of displacement in the Y-direction, n, of the block 401b relative to the reference location 401b', at which the difference is minimal (that is, the correlation is maximal), constitutes the amount of parallax in each direction. The distance to the object captured in the block 401a can be obtained using this amount of parallax.

Patent Document 1: JP 2003-143459A.
Patent Document 2: JP H07 (1995)-154663A.
Patent Document 3: JP H02 (1990)-280102A.

DISCLOSURE OF INVENTION

Problem to be Solved by the Invention

In the distance measurement method illustrated in FIG. 11, it is assumed that the locations of object image formation of the two images captured via the two optical systems with mutually parallel optical axes vary depending on the parallax, but the object images themselves do not change. However, in the conventional imaging apparatus illustrated in FIG. 10, this assumption is not valid, which has the disadvantage that accurate measurement of object distance becomes impossible. This is explained below.

FIG. 12 illustrates how the imaging apparatus shown in FIG. 10 captures an image of an object 200. The reference numeral 120a designates the field angle (field of view) of an optical system made up of the lens 100a and imaging area 101a, and the reference numeral 120b designates the field angle (field of view) of an optical system made up of the lens 100b and imaging area 101b. The field angles 120a, 120b are determined primarily by the imaging areas 101a, 101b. The attitude of the imaging apparatus is determined such that the object 200 is located within the field angles 120a, 120b of both optical systems.

The reference numeral 210 designates an object of high intensity, i.e. illumination, the sun, a high-reflectivity object, etc. The high-intensity object 210 is not contained in either of the field angles 120a, 120b. Nevertheless, when the high-intensity object 210 is in the vicinity of the field angle 120a, light rays emanating from the high-intensity object 210 are incident on the lens 100a, are reflected from the baffle wall 150, and then impinge on the imaging area 101a.

In FIG. 13, the reference numerals 410a, 410b designate images captured by the imaging areas 101a, 101b of FIG. 12. In the image 410a obtained in the imaging area 101a, a glare image 212 generated by the light rays 211 from the high-intensity object 210 is superimposed on the image 202 of the object 200. On the other hand, in the image 410b obtained in the imaging area 101b, only the image 202 of the object 200 is captured and the glare image 212 is absent.

Thus, if an object positioned outside of the field angles 120a, 120b emits strong light, then in some cases, this light, reflected by the baffle wall 150, impinges on one of the two imaging areas 101a, 101b and the object images in the two resultant images become different. In particular, when the high-intensity object 210 is located extremely close to the field angle of the imaging apparatus, i.e. when the light rays 211 from the high-intensity object 210 impinge on, and are reflected from, a location of the baffle wall 150 that is close to the imaging area, the reflected light incident on the imaging area is focused by the lens onto a small spot, as a result of which the glare image 212 tends to be sharp and bright.

If the amount of parallax is computed as explained in FIG. 11 and the glare image 212 described in FIG. 13 is generated in only one of the two images 400a, 400b, the object distance cannot be correctly computed because it is impossible to determine accurately the difference (correlation) between the image in the block 401a and the image in the block 401b. Furthermore, if the glare image 212 is relatively sharp, it is difficult to remove selectively only the glare image 212 by signal processing because of the closeness of the spatial frequencies of the glare image 212 and object image 202.

Treating the surface of the baffle wall 150 in FIG. 12 so as to enable absorption of the incident light rays 211 permits a certain reduction in the amount of light energy reflected by the baffle wall 150, but the reflection cannot be eliminated completely. If the reflection from the baffle wall 150 is not completely eliminated, then it is quite possible that if, for instance, the high-intensity object 210 emits light that is stronger than that of the object 200, a small amount of the light reflected from the baffle wall 150 will generate the glare image 212 and degrade the accuracy of distance measurement.

Furthermore, if the baffle wall 150 illustrated in FIG. 12 is removed, the light rays 211 passing through the lens 100a will not be reflected from the baffle wall 150 and, as a result, the glare image 212 will not be generated in the image 400a obtained from the imaging area 101a. However, the light rays 211 will be incident on the adjacent imaging area 101b and a harmful image analogous to the glare image 212 will be generated in the image 400b obtained from the imaging area 101b. If the baffle wall 150 is removed and the spacing between the lenses 100a, 100b (i.e. the interval between the imaging areas 101a, 101b) is made wider, the above-described factors degrading the accuracy of distance measurement will be eliminated. This, however, leads to new problems such as increased costs due to the need to use large imaging elements.

A similar degradation in the accuracy of distance measurement described above occurs when the light rays 211 from the high-intensity object 210 are incident on, and are reflected from, the inner surface of the lens barrel 102 rather than the baffle wall 150 and impinge on the imaging area. This problem, however, can be eliminated by positioning the lens barrel 102 away from the imaging areas 101a, 101b.

It is an object of the present invention to provide an imaging apparatus that solves the above-described problems of compound-eye imaging apparatuses and prevents the degradation in the accuracy of distance measurement due to light rays emanating from high-intensity objects positioned outside of the field angles.

Means for Solving Problem

The imaging apparatus of the present invention is made up of: multiple optical lenses disposed in a substantially coplanar alignment; multiple imaging areas corresponding to the multiple optical lenses in a one-to-one relationship; a baffle wall preventing light rays that pass through one optical lens among the above-mentioned multiple optical lenses from being incident on imaging areas that do not correspond to the one optical lens; and means for determining the amount of parallax by comparing multiple images captured in the multiple imaging areas. The baffle wall includes means for diffusively reflecting incident light rays. The imaging apparatus further includes means for removing low frequency components from the spatial frequencies of the multiple images captured in the multiple imaging areas. The means used for determining the amount of parallax determines the amount of parallax by comparing multiple images obtained by removal of their low frequency components using the means for removing low frequency components.

Effects of the Invention

In accordance with the present invention, light rays incident on the baffle wall are reflected diffusively, as a result of which high frequency components in the glare images generated by the reflected light are smoothed out and shifted towards low frequency components. Removing the low frequency components by signal processing allows for reliable elimination of the influence exerted on the accuracy of distance measurement by the light rays reflected from the baffle wall.

Thus, when the light rays emanating from a high-intensity object, i.e. illumination, the sun, a high-reflectivity object, etc., are not directly incident on the imaging area and impinge on the imaging area after hitting the baffle wall and undergoing reflection, degradation in the accuracy of object distance measurement due to the light rays emanating from the high-intensity object can be prevented. Thus, it is possible to implement an imaging apparatus capable of measuring distances with high accuracy.

DESCRIPTION OF THE INVENTION

Figure 1:
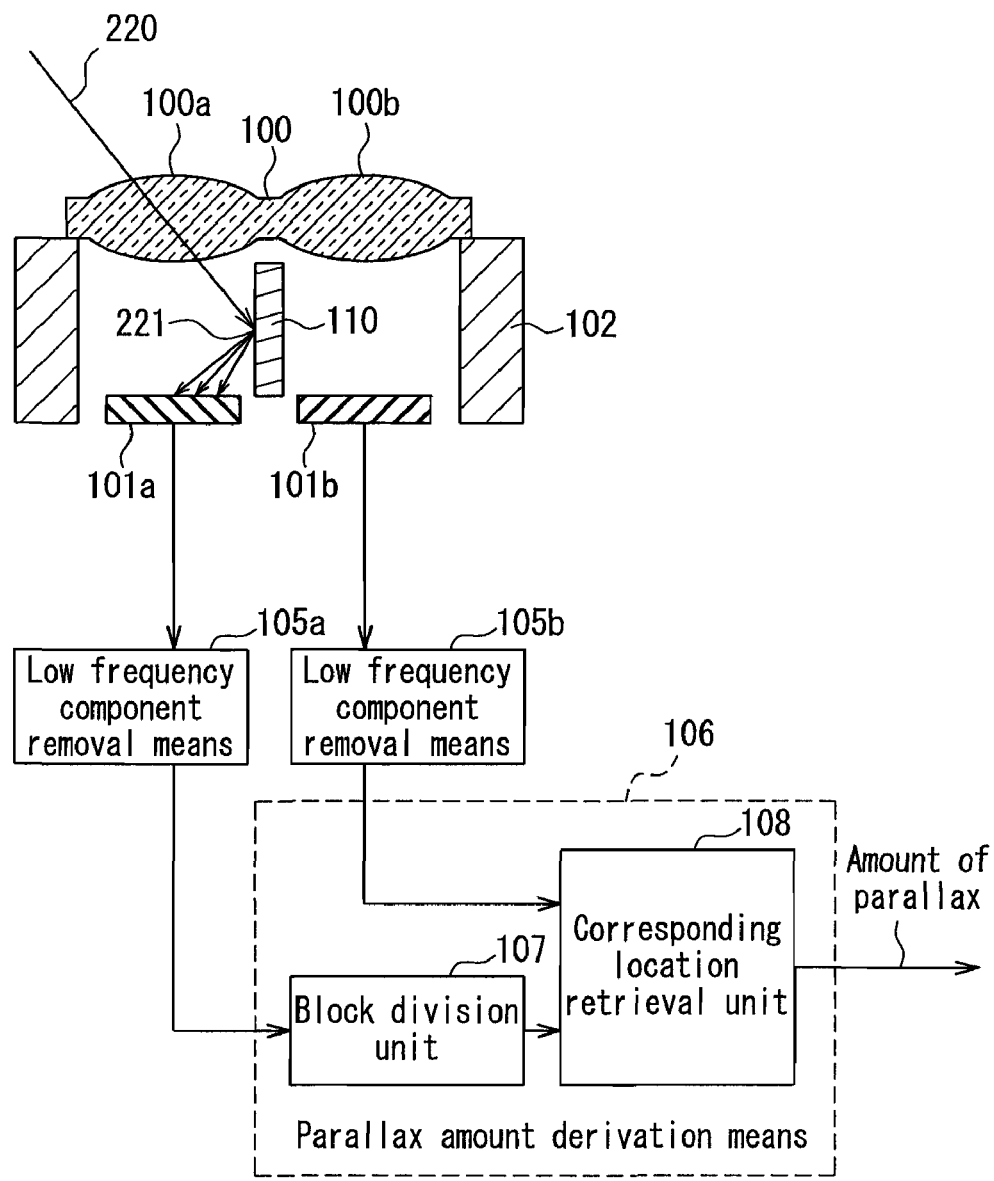
FIG. 1 is a diagram illustrating the overall configuration of a compound eye type imaging apparatus with distance measuring capability according to an embodiment of the present invention.

In the above-described imaging apparatus of the present invention, it is preferable that raised and depressed portions provided on the surface of the baffle wall are utilized as means for diffusively reflecting light rays. This allows for imparting diffuse reflective properties to the baffle wall in a simple and inexpensive manner.

In such a case, it is preferable for the raised and depressed portions to be arranged in an irregular fashion. This allows for preventing the generation of high frequency components in the glare images as a result of interference by the reflected light. Therefore, the means for removing low frequency components can be used to remove the glare images in a reliable manner, which permits distance measurement with few errors.

Alternatively, transparent microparticles contained at least near the surface of the baffle wall may be used as a means for diffusively reflecting light rays. This also allows for imparting diffuse reflective properties to the baffle wall in a simple and inexpensive manner.

In such a case, it is preferable that the shape of the transparent microparticles is irregular. This allows for preventing the generation of high frequency components in the glare images as a result of interference by the reflected light. Therefore, the means for removing low frequency components can be used to remove the glare images in a reliable manner, which permits distance measurement with few errors.

In the above-described imaging apparatus of the present invention, it is preferable that the means for removing low frequency components removes low frequency components from the spatial frequency in the direction in which the parallax is generated. This allows for reducing the computing time.

It is preferable that the angle of diffusion of the baffle wall with respect to light rays, whose angle relative to the baffle wall is half the field angle of the imaging apparatus, is not less than 5 degrees. As a result, the high frequency components of the glare images can be shifted towards low frequency components in a reliable manner, which permits distance measurement with few errors.

If the diffusion factor of the baffle wall with respect to a light ray, passing through the center of the optical lens and impinging on the baffle wall such that the central light ray of the reflected light diffusively reflected from the baffle wall is incident on a location that is closest to the baffle wall on the peripheral edge of the imaging area, is designated as $\alpha$, and the cutoff resolution frequency of the optical lens is designated by $\beta$, then the means for removing low frequency components preferably removes those spatial frequency components in the multiple captured images that are equal to, or smaller than, $\beta/\alpha$. Setting a threshold value for the removal of the low frequency components in accordance with the configuration of the imaging apparatus in this manner allows for the influence of the glare images to be removed without damaging the object image-related information required for distance measurement, thereby permitting distance measurement with fewer errors.

The imaging apparatus of the present invention further includes an illuminating device for illuminating the object, with the brightness of the illumination preferably varied in accordance with the intensity distribution of the object image. This allows for measuring distances with high accuracy even when the intensity of the high-intensity object positioned outside of the field angle is extremely high.

The imaging apparatus of the present invention preferably further includes means for dividing one image from among the multiple images captured in the multiple imaging areas into multiple blocks, means for retrieving blocks corresponding to the respective multiple blocks in other images among the multiple images, and means for obtaining a single composite image from the multiple images. In such a case, it is preferable that the means for obtaining a composite image obtains the composite image by comparing the contrast levels of multiple mutually corresponding blocks contained in the multiple images and selecting blocks with a higher level of contrast. This allows for implementing an imaging apparatus which, in addition to distance measurement, is capable of outputting high-quality object images.

In such a case, the imaging apparatus of the present invention preferably further includes a lens barrel that prevents light rays that do not pass through any of the multiple optical lenses from being incident on any of the multiple imaging areas. In such a case, the locations, in which light rays emanating from a shared object located beyond the field angle impinge on the multiple imaging areas upon reflection from the inner surface of the lens barrel or baffle wall, are preferably mutually different in the multiple imaging areas. This allows for obtaining a high-contrast composite image because the locations of the glare images in the multiple images obtained from the multiple imaging areas can be made mutually different.

One embodiment of the present invention is illustrated below. However, it goes without saying that the present invention is not limited to this embodiment.

FIG. 1 shows an outline of the configuration, as well as the image processing path, of a compound eye type imaging apparatus with distance measuring capability according to one embodiment of the present invention. This imaging apparatus includes a lens array 100, which is made up of two lenses 100a, 100b disposed in a substantially coplanar alignment such that their optical axes are mutually parallel, and two imaging areas 101a, 101b respectively corresponding to the two lenses 100a, 100b. The two imaging areas 101a, 101b are obtained by dividing the light-receiving region of a single shared imaging element. The lens barrel 102 shields the two optical paths between the lenses 100a, 100b and imaging areas 101a, 101b from the outside environment so as to prevent light rays that do not pass through the two lenses 100a, 100b from being incident on the imaging areas 101a, 101b. Moreover, a baffle wall 110 is interposed between the two optical paths so as to prevent light rays passing through either one of the lenses 100a, 100b from being incident on the imaging area among the imaging areas 101a, 101b that does not correspond to the above-mentioned lens. The baffle wall 110 includes scattering means that reflects and scatters (i.e. diffusively reflects) incident light rays.

The reference numeral 220 shows an exemplary light ray that emanates from a high-intensity object (not shown) positioned outside of the field angle of the imaging apparatus, passes through the lens 100a, and is incident on a point 221 of the baffle wall 110. Upon reflection from point 221, the light ray 220 undergoes diffusive reflection due to the scattering characteristic of the baffle wall 110, expands and impinges on the imaging area 101a. Thus, the glare image created by the light ray 220 in the image captured by the imaging area 101a is smoothed out by the diffusive reflection of the light ray 220. This lowers the contrast of the glare image and shifts the high frequency components of the image information towards low frequency components. The imaging area 101a captures an image resulting from the superposition of this glare image shifted towards low frequency components and an object image formed by direct incidence through the lens 100a onto the imaging area 101a, converts it to image information, and outputs it.

Figure 2A:
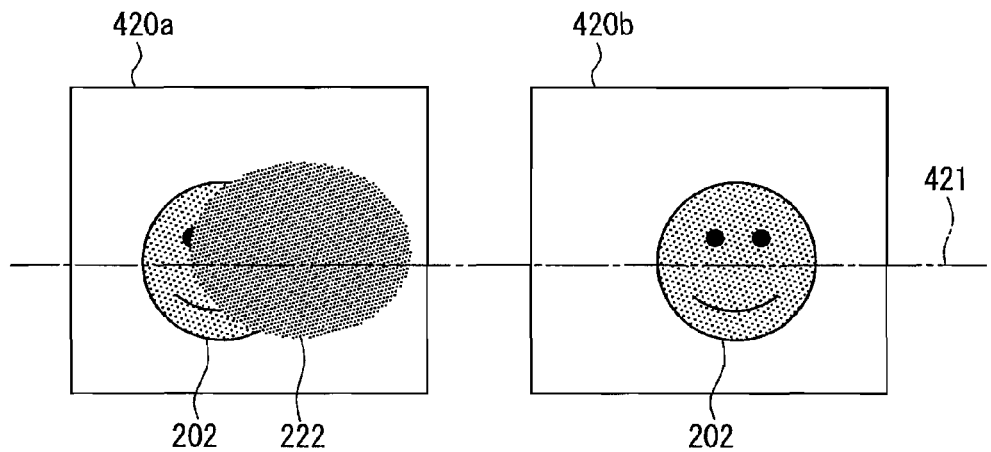
FIG. 2A illustrates images captured by two imaging areas in an imaging apparatus according to an embodiment of the present invention.
Figure 2B:
FIG. 2B illustrates information on the intensity of pixels located along the alternate long and short dash line of FIG. 2A.

In FIG. 2A, the reference numerals 420a, 420b designate images captured by the imaging areas 101a, 101b. The reference numeral 202 is an object image formed by direct incidence through the lenses 100a, 100b onto the imaging areas 101a, 101b, and 222 is a glare image produced when the light ray 220 passing through the lens 100a undergoes diffusive reflection from the baffle wall 110 and impinges on the imaging area 101a. FIG. 2B shows information on the intensity of pixels located along the alternate long and short dash line 421 of FIG. 2A. Due to the scattering characteristic of the baffle wall 110, the high frequency components of the image information of the glare image 222 are shifted towards low frequency components, as a result of which the intensity of the glare image 222 varies more smoothly than the intensity of the object image 202. In the image information obtained from the imaging area 101a, the smoothly varying intensity information of the glare image 222 is superimposed on information on the intensity of the object image 202.

As shown in FIG. 1, the image information output from the imaging areas 101a, 101b is input to low frequency component removal means 105a, 105b, in which the low frequency components of the spatial frequency are removed by signal processing. For instance, the low frequency components can be separated easily by performing digital signal processing using differential filters or frequency cutoff filters based on fast Fourier transforms. The frequency (threshold value) of the removed low frequency components is set taking into account the scattering characteristic of the baffle wall 110 and the degree of proximity of the high-intensity object to the field angle of the imaging apparatus that is capable of producing harmful glare images affecting the accuracy of distance measurement.

Figure 3:
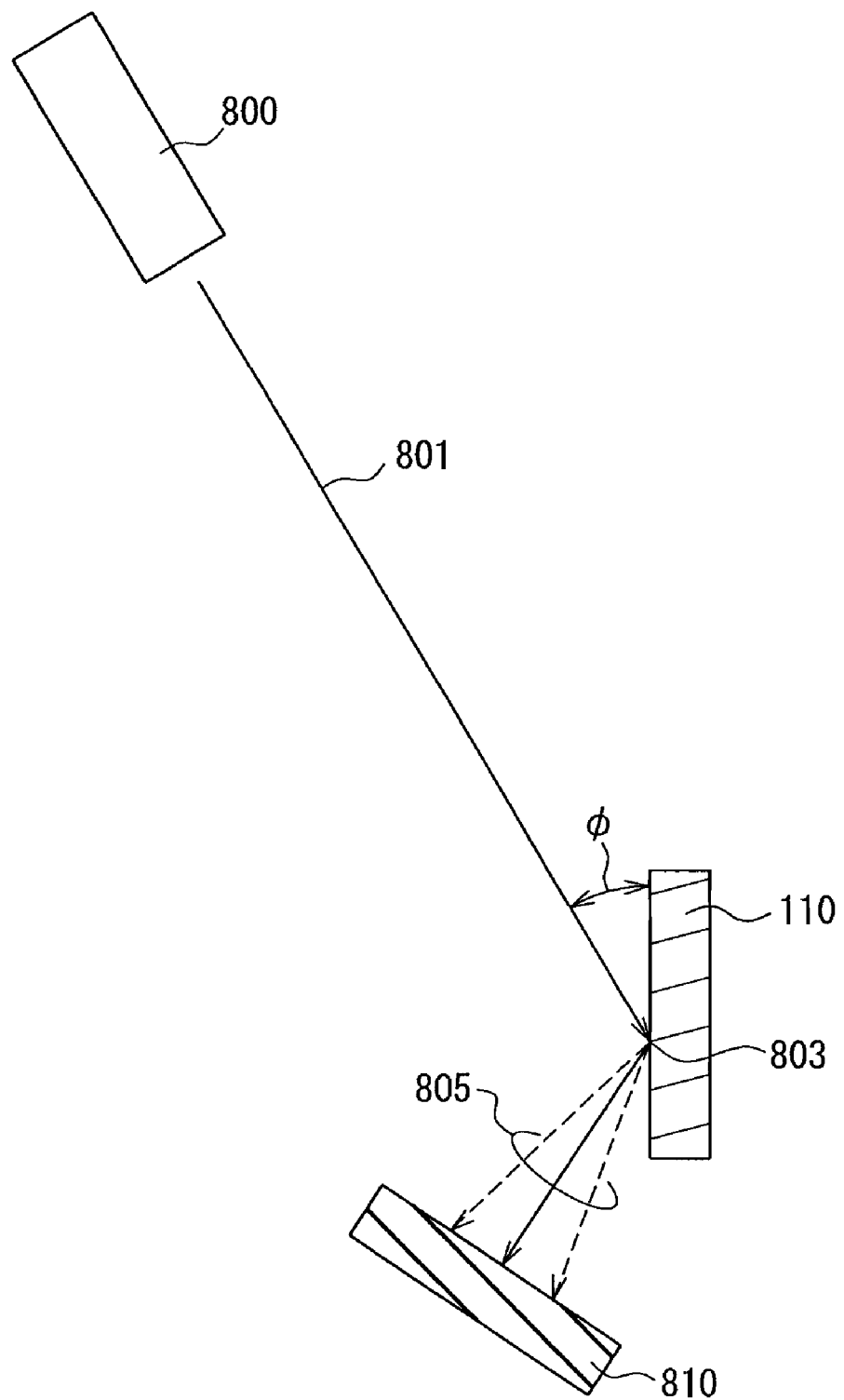
FIG. 3 is a diagram illustrating a method used to evaluate the scattering characteristic of the baffle wall in the imaging apparatus of the present invention.

The method used for evaluating the scattering characteristic of the baffle wall 110 will be explained with reference to FIG. 3. Laser light 801 emanating from a laser light source 800 is obliquely incident on the baffle wall 110. The angle between the laser light 801 and the surface of the baffle wall 110 is designated as φ. The laser light 801 undergoes diffusive reflection at a point 803 on the baffle wall 110. The reflected light 805 is detected using an imaging element 810, whose light-receiving surface is disposed normal to the direction of specular reflection, and the scattering characteristic of the baffle wall 110 is evaluated in accordance with the size of the laser light spot formed on the imaging element 810.

Figure 4:
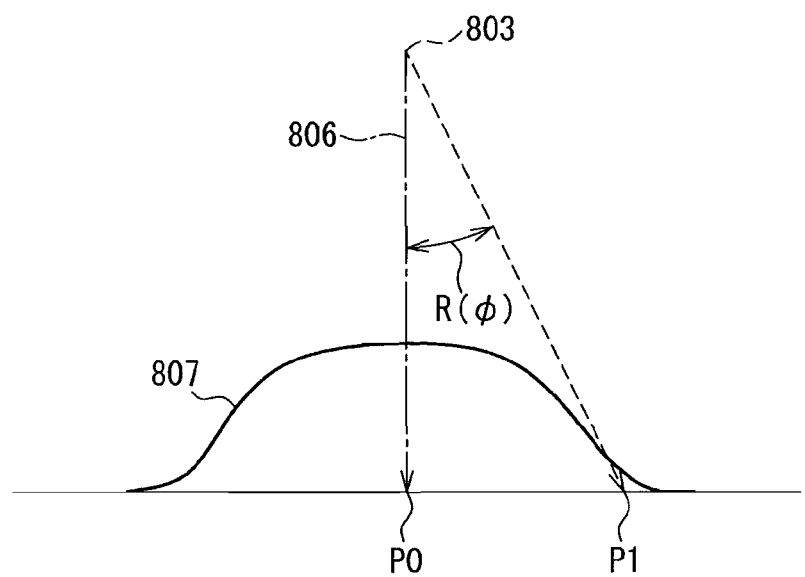
FIG. 4 is a diagram used to explain the definition of the scattering characteristic of the baffle wall in the imaging apparatus of the present invention.

FIG. 4 shows the intensity distribution 807 of the spot formed on the imaging element 810 by reflected light produced by the laser light reflected at the point 803 on the baffle wall 110 along a straight line transverse to the central light ray 806 of the reflected light. The intensity distribution 807 describes a smooth curve in which the intensity is highest at the spot center P0 on which the central light ray 806 impinges, and gradually decreases with increasing distance therefrom. The distance between the spot center P0, in which the intensity is highest, and the point P1, at which the intensity constitutes 1/10 of the maximum value, is called the "spot radius". The angle between the spot center P0 and point P1 relative to the point 803 on the baffle wall 110, from which the laser light is reflected, is called the diffusion angle R. If the angle φ between the laser light 801 and the surface of the baffle wall 110 (see FIG. 3) changes, the diffusion angle R changes as well. Therefore, the diffusion angle R is expressed as a function R(φ) of the angle φ. The function R(φ) is called the scattering characteristic of the baffle wall 110. The scattering characteristic R(φ) can be determined by performing reflected light measurements while changing the angle of incidence of the laser light 801 on the baffle wall 110 and changing the angle and position of the imaging element 810 such that it is arranged normal to the respectively changing direction of specular reflection.

Figure 5:
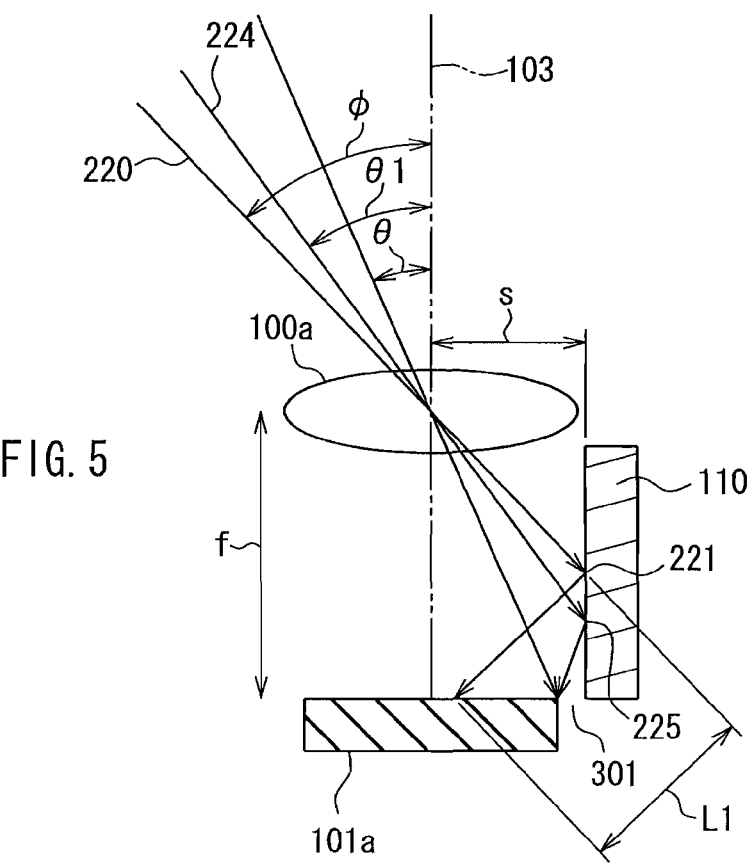
FIG. 5 is a diagram used to explain conditions required for the generation of harmful glare images in the imaging apparatus of the present invention.

The size of the spot (spot radius) formed on the imaging element 810 by the light rays reflected from the baffle wall 110 depends on the distance between the location of reflection 803 and imaging element 810. FIG. 5 describes a situation, wherein the light ray 220 passing through the center of the lens 100a at an incidence angle of φ impinges on the baffle wall 110 possessing a scattering characteristic R(φ), undergoes diffusive reflection, and impinges on the imaging area 101a. If the focal length of the lens 100a is designated as f and the distance from the optical axis 103 of the lens 100a to the baffle wall 110 is designated as s, then, assuming that the baffle wall 110 is normal to the imaging area 101a, the distance L1 from the point of reflection 221 of the light ray 220 on the baffle wall 110 to the imaging area 101a along the central light ray of the reflected light will be:

$$L1 = \frac{(f \times \tan\phi - s)}{\sin\phi} \quad [\text{Eq. 1}]$$

Therefore, at a location spaced by the distance L1 from the reflection point 221 on the baffle wall 110, the diameter of the light ray 220 is expanded by a factor of $\alpha(\phi)$, as defined by the following formula:

$$\alpha(\phi) = 2 \times \frac{(f \times \tan\phi - s)}{\sin\phi} \times \tan(R(\phi)) \quad [\text{Eq. 2}]$$

The factor $\alpha(\phi)$ is called the diffusion factor of the baffle wall 110 with respect to the light ray 220.

In FIG. 5, as the angle of incidence $\phi$ of light rays passing through the center of the lens 100a on the lens 100a approaches the half field angle $\theta$ of the imaging apparatus, the location at which the light ray is incident on the baffle wall 110 approaches the imaging area 101a, producing a harmful high-contrast glare image and degrading the accuracy of distance measurement. Accordingly, in the present invention, the evaluation of the scattering characteristic of the baffle wall 110 is performed using the diffusion angle (i.e. the scattering characteristic R ($\theta$)) of the baffle wall 110 obtained when the angle $\phi$ made by the incident light ray with the baffle wall 110 is equal to the half field angle $\theta$. The larger the diffusion angle of the baffle wall 110 is, the better, because this allows for shifting the high frequency components of the glare image towards low frequency components in a reliable manner.

The probability of generating a glare image with the strongest possible contrast is high when, as shown in FIG. 5, the light ray 224 passes through the center of the lens 100a at an incident angle of $\theta 1$ ($\theta 1 > \theta$), impinges on the point 225 on the baffle wall 110 and undergoes diffusive reflection such that the central light ray of the diffusively reflected light impinges on a location that is closest to the baffle wall 110 on the peripheral edge of the imaging area 101a. In such a case, the diffusion factor of the baffle wall 110 with respect to the light ray 224 is $\alpha(\theta 1)$. If the cutoff resolution frequency of the lens 100a is designated as $\beta$ [cycles/pixel], then the cutoff resolution frequency of the light ray 224 diffusively reflected from the baffle wall 110 is reduced to $\beta/\alpha(\theta 1)$ [cycles/pixel] because the light ray 224, which generates the most harmful glare image, is scattered with a diffusion factor of $\alpha(\theta 1)$. Specifically, due to the diffusive reflection of the light ray 224 from the baffle wall 110, the high frequency components of the light ray 224 that are equal to or higher than $\beta/\alpha(\theta 1)$ [cycles/pixel] are smoothed out and shifted towards low frequency components. Therefore, the components that make up the glare image can be removed in a reliable manner by removing the low frequency components that are equal to or lower than $\beta/\alpha(\theta 1)$ [cycles/pixel] from the image output from the imaging area 101a. It should be noted that the threshold value for removing the low frequency components does not have to be the above-mentioned value of $\beta/\alpha(\theta 1)$ [cycles/pixel] and a higher frequency may be used so long as the features of the object image are not degraded.

Figure 2C:
FIG. 2C illustrates information on the intensity of pixels located along the alternate long and short dash line of FIG. 2A upon removal of the low frequency components.

FIG. 2C shows information on the intensity of pixels located along the alternate long and short dash line 421 of FIG. 2A in images obtained by removing the low frequency components from the spatial frequencies of the images captured by the imaging areas 101a, 101b (see FIG. 2A). When the low frequency components are removed from the intensity information illustrated in FIG. 2B by signal processing, only the contour of the object image 202 or other portions exhibiting significant intensity variations can be extracted as shown in FIG. 2C. Thus, the removal of the low frequency components does selectively remove the glare image 222 created by light reflected from the baffle wall 110, but there is no loss of features in the object image 202.

Figure 11:
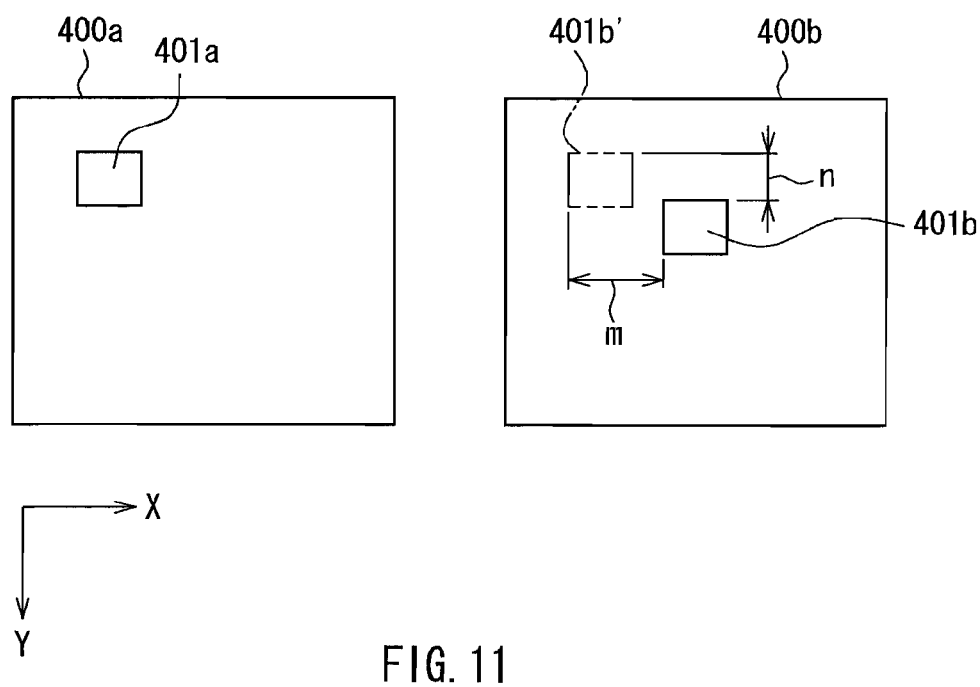
FIG. 11 is a diagram used to explain the method used for computing the amount of parallax in a conventional compound eye type imaging apparatus.
Figure 12:
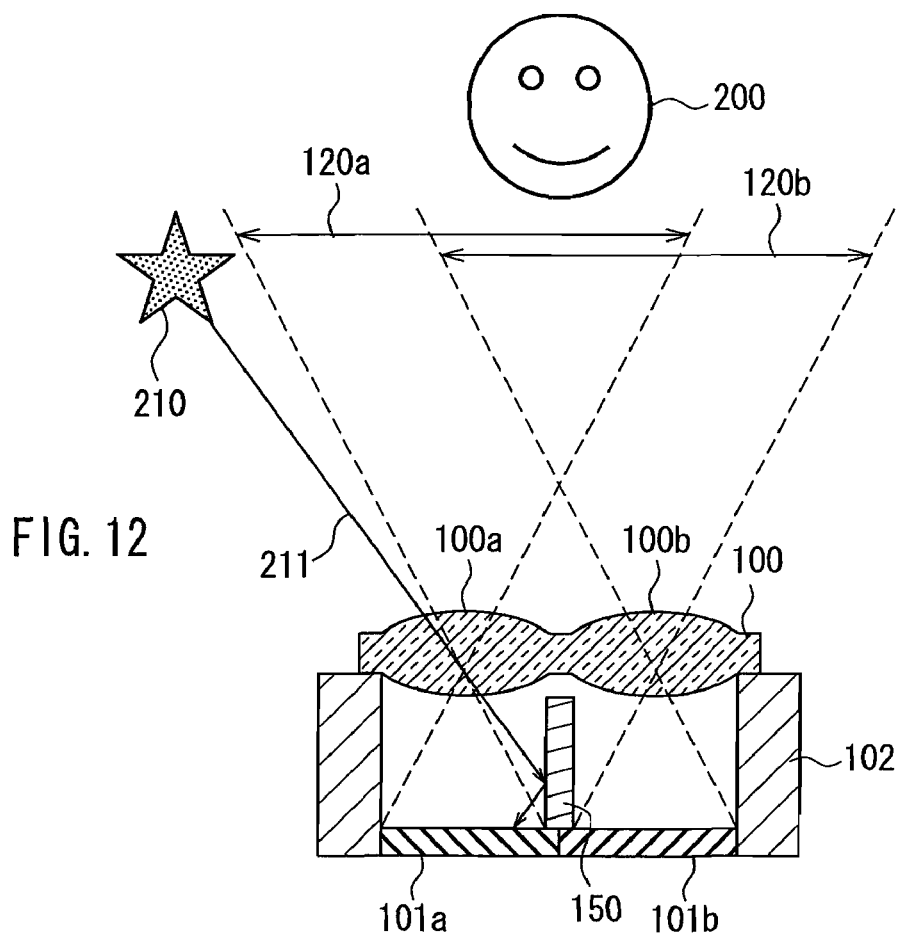
FIG. 12 is a diagram used to explain the phenomenon of glare image generation by the baffle wall in a conventional compound eye type imaging apparatus.
Figure 13:
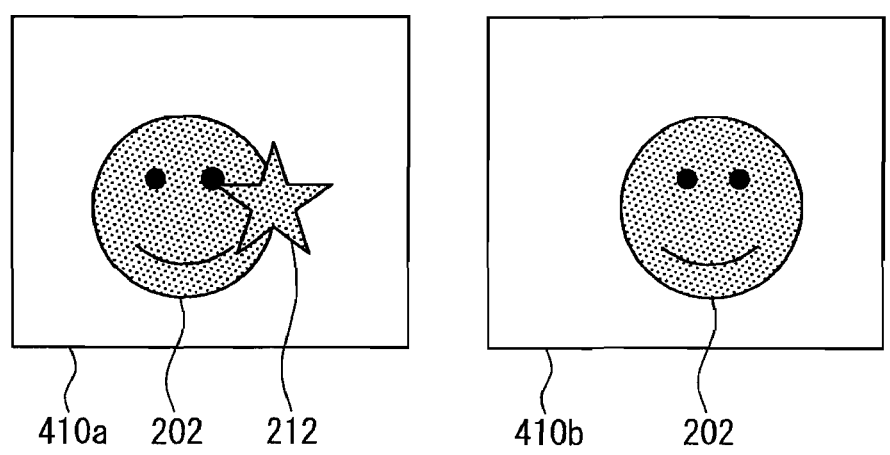
FIG. 13 is a diagram illustrating two images in a conventional compound eye type imaging apparatus, with a glare image generated in only one of them.

The parallax amount derivation means 106 (see FIG. 1) determines the amount of parallax from the two images produced by removing the low frequency components as described above, in a manner similar to the distance measurement operation of the conventional imaging apparatus (see FIG. 11). As shown in FIG. 11, in the present embodiment, an evaluation value R (m, n) describing the difference (correlation) between the image in the block 401a and the image in the block 401b is determined using a Sum Absolute Difference (SAD), which is determined based on the following formula.

$$R(m, n) = \sum_k \sum_l |I1(k, l) - I2(k + m, l + n)| \quad [\text{Eq. 3}]$$

Here, I1(k, l) represents pixel intensity in the block 401a of the reference image 400a and I2(k+m, l+n) represents pixel intensity in the block 401b of the comparison image 400b. The values k and l are pixel addresses (integers) in the X-axis direction and Y-axis direction. The amount of displacement, m and n, of the block 401b in the X-axis direction and Y-axis direction does not have to be limited to integers. For instance, interpixel intensity can be determined by performing interpolation using the intensity of peripheral pixels, which allows for obtaining the amount of parallax at a resolution below the pixel pitch. Bilinear interpolation, bicubic interpolation, cubic convolution interpolation, and other well-known interpolation techniques can be used to obtain the interpixel intensity.

The evaluation value R (m, n) decreases when there is more resemblance between the image in the block 401a and the image in the block 401b, and conversely, increases if there is less resemblance. The values m and n obtained when the evaluation value R (m, n) reaches a minimum constitute the amount of parallax in the X-axis direction and Y-axis direction.

If the evaluation value R (m, n) is obtained every time the block 401b is displaced in the X-axis direction and Y-axis direction (i.e. both m and n are changed), the computing operation requires a considerable amount of time. For instance, to reduce the computing time, the direction of the baseline linking the centers of the lenses 100a, 100b may be used as the X-axis direction. This allows for ignoring the parallax component in the Y-axis direction. In such a case, it is sufficient to determine the evaluation value R (m, 0) by displacing the block 401b only in the X-axis direction (i.e. changing only m, with n=0 at all times). The value of m obtained when the evaluation value R (m, 0) reaches a minimum is used as the amount of parallax.

The amount m of parallax is a value associated with the pixel pitch of the imaging element. Therefore, the distance A to the object can be obtained in accordance with the triangulation principle based on the following formula:

$$A = \frac{D \times f}{m \times p} \quad [\text{Eq. 4}]$$

wherein p is the pixel pitch of the imaging element, f is the focal length of the lenses 100a, 100b, and D is the spacing between the lenses 100a, 100b.

As shown above, even when there is a high-intensity object etc. located in the vicinity of the field angle, the present embodiment allows for preventing concomitant degradation in the accuracy of distance measurement and makes it possible to measure distances to objects correctly.

If the distance from the location, where light rays emanating from a high-intensity object hit the baffle wall and undergo diffusive reflection, to the imaging area is short, the reflected light falls on the imaging area without undergoing sufficient diffusion and it may be impossible to remove the glare image to a sufficient degree using the low frequency component removal means. In such a case, as shown in FIG. 5, it is preferable to provide an inactive region 301, in which no image acquisition takes place, between the imaging area and baffle wall 110. In FIG. 5, the inactive region 301 is depicted as a gap (clearance). However, if the imaging areas 101a, 101b are obtained by dividing the light-receiving region of a single common imaging element, the inactive region 301 can be substantially provided by not using information from the pixels located inside the inactive region 301, etc.

Moreover, when the high-intensity object is in the vicinity of the field angle and its intensity is extremely high, the imaging element sometimes may become saturated by the glare image of the high-intensity object and obtaining image information related to the object image may be impossible. For this reason, in some cases it may be impossible to obtain object image-related image information even upon removal of the low frequency components from the spatial frequency of the image information. In such a case, it is preferable to provide an illuminating device for illuminating the object, with the brightness of the illumination varied in accordance with the intensity distribution of the object image. This allows prevention of defects in image information related to the object image and increases tolerance with respect to the intensity of the high-intensity objects located in the vicinity of the field angle.

The baffle wall 110 does not necessarily have to diffusively reflect all of the incident light and some of the light may be absorbed. In general, it is preferable for the baffle wall 110 to possess light-absorbing properties because they can reduce the influence of the glare images. In such a case, light that undergoes reflection without being absorbed is diffusively reflected and the above-described effects can be achieved in a similar manner.

The imaging apparatus of the present invention, which possesses functionality for measuring distances to objects, simultaneously can capture images of the objects. However, as evident from the explanations above, no matter how much the light emanating from a high-intensity object positioned outside of the field angle is diffusively reflected by the baffle wall, glare images with high frequency components shifted towards low frequency components still will be superimposed onto the image of the object and a high-quality object image cannot be obtained "as is". Moreover, when the low frequency components of the spatial frequency are removed from the image information obtained from the imaging areas, some of the contrast information related to the object image is removed simultaneously as well, which makes it impossible to obtain a high-quality object image.

Figure 6:
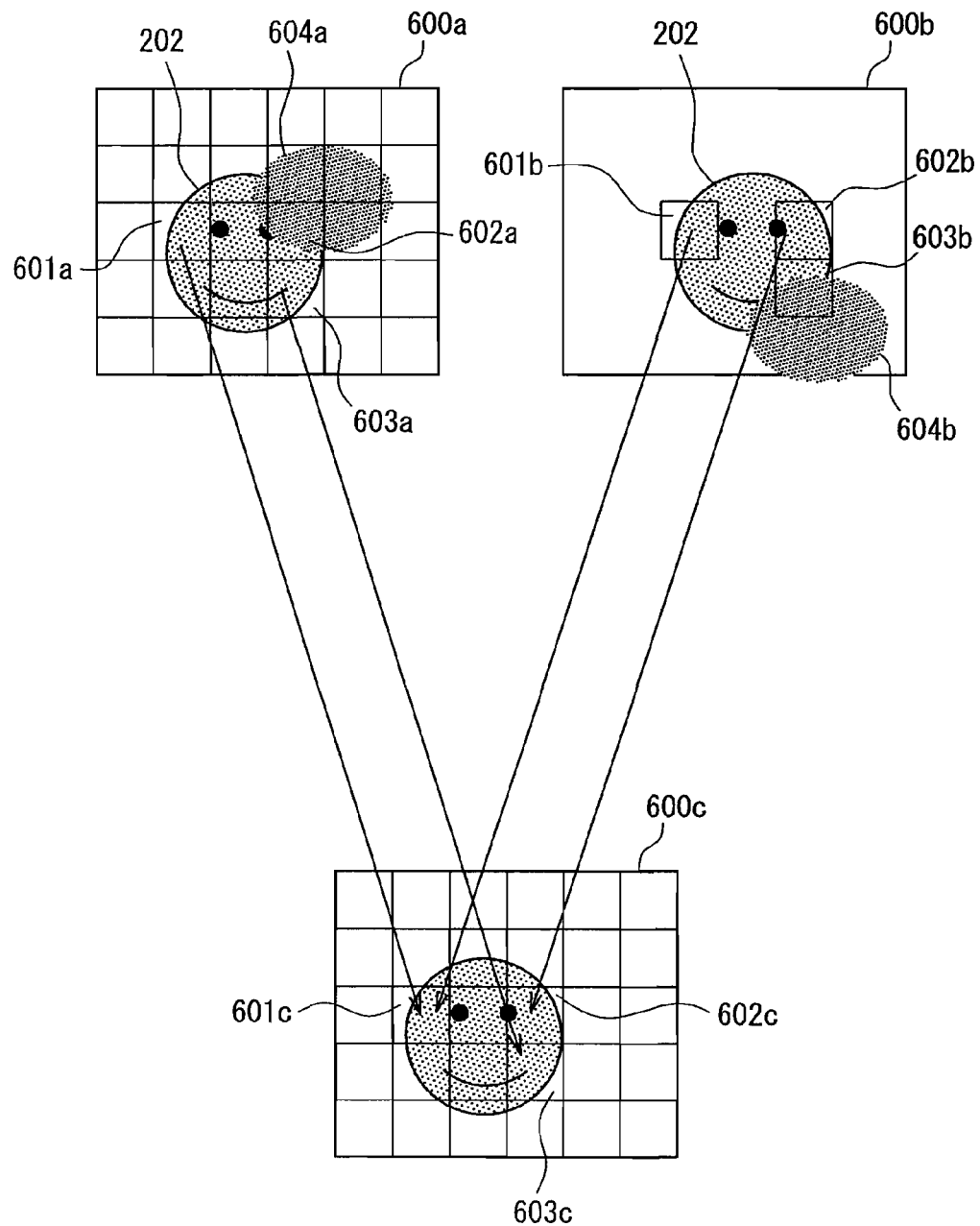
FIG. 6 is a diagram used to explain the image compositing method used in the imaging apparatus of the present invention.

Thus, in the present embodiment, excellent images are obtained by compositing portions insignificantly affected by the glare images, which are selected from the images obtained from the imaging areas 101a, 101b (images produced prior to the removal of the low frequency components) and used in the determination of the amount of parallax. This will be explained with reference to FIG. 6. In FIG. 6, the reference numerals 600a, 600b designate images obtained from the respective imaging areas 101a, 100b prior to the removal of the low frequency components, 202 is an object image, and 604a, 604b are glare images produced by a shared high-intensity object positioned outside of the field angle. In the present embodiment, these two images, 600a, 600b, are composited to yield a single high-quality image 600c. How this is done is explained hereinbelow.

Figure 7:
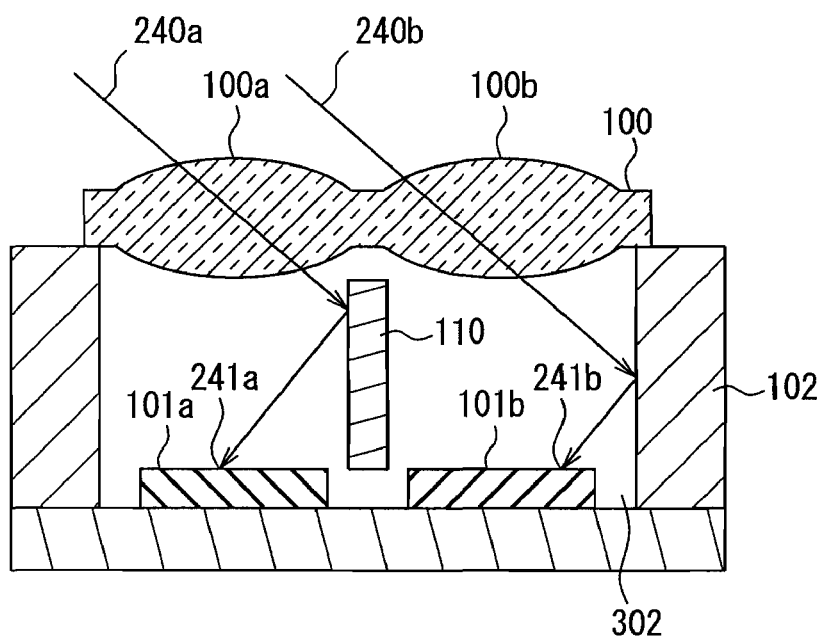
FIG. 7 is a cross-sectional view used to explain how glare images are generated in various locations by the baffle wall and lens barrel in the imaging apparatus of the present invention.

In the present embodiment, as shown in FIG. 6, the locations in which the glare images 604a, 604b are superimposed on the object image 202 have to be different in the images 600a and 600b. An arrangement that achieves this goal is illustrated in FIG. 7. In FIG. 7, the reference numerals 240a, 240b are light rays emanating from the same location of the high-intensity object (not shown) positioned outside of the field angle. Since the distance to the high-intensity object is longer in comparison with the distance between the two lenses 100a, 100b, the light rays 240a, 240b can be considered parallel. The light ray 240a passes through the lens 100a, impinges on the baffle wall 110, and undergoes diffusive reflection, with its central light ray being incident on point 241a on the imaging area 101a. On the other hand, the light ray 240b passes through the lens 100b, impinges on the inner surface of the lens barrel 102, and undergoes diffusive reflection, with its central light ray being incident on point 241b on the imaging area 101b. Since there is a gap 302 provided between the imaging area 101b and lens barrel 102, the distance between the imaging area 101a and baffle wall 110 is different from the distance between the imaging area 101b and lens barrel 102. Therefore, the location of incidence 241a of the light ray 240a on the imaging area 101a is different from the location of incidence 241b of the light ray 240b on the imaging area 101b. Therefore, as shown in FIG. 6, the locations, in which the glare images 604a, 604b are formed in the images 600a, 600b, can be rendered different.

It should be noted that arrangements producing different locations for the formation of the glare images 604a, 604b in the images 600a and 600b by light rays emanating from the same location of a high-intensity object are not limited to the arrangement of FIG. 7. For the imaging areas 101a and 101b, it is sufficient to use different relative relationships between the imaging areas 101a, 101b and members (e.g., the baffle wall 110, the lens barrel 102) disposed on the periphery of the imaging areas 101a, 101b, from which light rays emanating from a high-intensity object may be reflected to become incident on the imaging areas 101a, 101b. For instance, in the imaging areas 101a and 101b, the angles of the baffle wall 110 and lens barrel 102 relative to the imaging areas 101a, 101b may be rendered different.

As described above, when the distance to an object is measured using the imaging apparatus of the present invention, the apparatus retrieves blocks (images) corresponding to particular locations of the object in the two images 600a, 600b and determines the amount of parallax from the amount of shift between the blocks. Two mutually corresponding blocks contained in the two images 600*a*, 600*b* obtained in the process of computation are compared, and the block having a higher-quality image is selected. Performing such computation for all the blocks constituting the object image and compositing the selected blocks allows for obtaining an object image which, on the whole, has excellent image quality.

In FIG. 6, the reference numerals 601*a*, 602*a*, and 603*a* are representative blocks in the image 600*a* used for the above-described computation of the amount of parallax. The reference numerals 601*b*, 602*b*, and 603*b* are blocks in the image 600*b* that are believed to exhibit the least amount of difference from, respectively, the blocks 601*a*, 602*a*, and 603*a*. Accordingly, the block 601*a* and block 601*b* contain image information associated with the same location of the object. Similarly, the blocks 602*a* and 602*b* and the blocks 603*a* and 603*b* contain image information associated with the same locations in the object.

In the object image 202, the contrast of the image declines in the portions overlapping with the glare images 604*a*, 604*b*. Therefore, a block affected by the glare image to a lesser degree can be selected by comparing the contrast levels of the images in the two mutually corresponding blocks contained in the two images 600*a*, 600*b* and selecting the block exhibiting a higher level of contrast. For instance, a comparison of the contrast levels in the block 601*a* and block 601*b* shows that the level of contrast in both is approximately the same, and, accordingly, an image obtained by averaging the image in the block 601*a* and the image in the block 601*b* is used as the image of block 601*c* in a composite image 600*c*. A comparison of the contrast levels in the block 602*a* and block 602*b* indicates that the image in the block 602*b* has a higher level of contrast, and, accordingly, the image in the block 602*b* is used as the image of block 602*c* in the composite image 600*c*. A comparison of the levels of contrast in the block 603*a* and block 603*b* shows that the image in the block 603*a* has a higher level of contrast, and, accordingly, the image in the block 603*a* is used as the image of block 603*c* in the composite image 600*c*. In this manner, a high-quality image that does not contain the glare images 604*a*, 604*b* can be obtained by generating the composite image 600*c* using blocks selected from the blocks constituting the images 600*a*, 600*b* prior to the removal of the low frequency components.

In the explanations above, the images 600*a*, 600*b* were divided into multiple blocks in such a manner that the blocks did not overlap with each other. However, the present invention is not limited to this method and division may be performed such that the blocks overlap with each other. As a result, the blocks constituting the composite image 600*c* will overlap with each other as well, thereby allowing images to be smoothly connected between the blocks and, as a result, making it possible to obtain a higher-quality composite image 600*c*.

Although in the embodiment described above, the imaging areas 101*a*, 101*b* were formed by dividing the light-receiving region of a single shared imaging element, the present invention is not limited to this method and permits use of two independent imaging elements.

In the imaging apparatus of the present invention, the number of optical systems made up of an optical lens and an imaging area does not have to be limited to two systems, as in the above-described embodiment, and three or more systems may be used as well.

Although in the embodiment described above the surface of the baffle wall 110 facing the imaging areas 101*a*, 101*b* was flat, the present invention is not limited to such an arrangement and allows for using convex, concave, and other curved surfaces as well.

WORKING EXAMPLES

Below, the present invention is explained more specifically with reference to working examples.

Working Example 1

The configuration of the imaging apparatus used in Working Example 1 was as shown in FIG. 1. A lens array 100, which included two lenses 100*a*, 100*b* with a focal length of 3.75 mm in the green wavelength region and an intercenter distance of 2.6 mm along the baseline of the lenses 100*a*, 100*b*, was formed integrally out of polycarbonate. A single black-and-white CCD with 2,048×1,530 pixels and a pixel pitch of 2.2 μm was located in the image plane of this lens array 100. Two imaging areas 101*a*, 101*b*, which corresponded to the lenses 100*a*, 100*b*, were defined within the light-receiving region of this CCD. Each one of the imaging areas was 800×600 pixels in size. A green color filter (not shown) was interposed between the lenses 100*a*, 100*b* and imaging areas 101*a*, 101*b* for wavelength selection purposes, which prevented the resolution of the object image from declining as a result of chromatic aberration in the lenses 100*a*, 100*b*. To align the lenses 100*a*, 100*b* with the CCD and prevent the light that does not pass through the lenses 100*a*, 100*b* from being incident on the imaging areas 101*a*, 101*b*, there is provided a lens barrel 102 made of polycarbonate, which is rendered black in color by the introduction of carbon therein. Also, there is provided a baffle wall 110 made of polycarbonate, which is similarly rendered black in color by the introduction of carbon therein. The surface of the baffle wall 110 is sandblasted to achieve an arithmetic average surface roughness (Ra) of 15 μm in order to provide the surface of the baffle wall 110 with means for diffusively reflecting light rays. When the scattering characteristic of this baffle wall 110 was measured using the previously described method, it was found that the angle of diffusion for laser light, whose angle of incidence on the surface of the baffle wall 110 was half the field angle of the imaging apparatus, was 5 degrees. Moreover, the diffusion factor of the baffle wall 110 with respect to a light ray passing through the center of the lens and incident on the baffle wall 110 such that the center light ray of the reflected light diffusively reflected from the baffle wall 110 was incident on a location closest to the baffle wall 110 on the peripheral edge of the imaging area, was about 30×. The cutoff resolution frequency of the lenses 100*a*, 100*b* was designed to be 2 cycles/pixel, i.e. higher than the cutoff resolution frequency of the CCD. Thus, high frequency components equal to, or higher than $2/30 \approx 0.067$ cycles/pixel in the spatial frequency of the glare image produced by light diffusively reflected from the baffle wall 110 were shifted towards lower frequency components.

It should be noted that while the means used for diffusively reflecting light rays in Working Example 1 was formed by sandblasting the surface of the baffle wall 110, the present invention is not limited to this method. The means for diffusively reflecting light rays can be formed on the surface of the baffle wall 110, for instance, by molding the baffle wall 110 in a mold provided with raised and depressed portions used for diffusively reflecting light rays.

It is preferable for the raised and depressed portions on the surface of the baffle wall 110 to be irregular because if the raised and depressed portions on the surface of the baffle wall 110 are uniform, the light reflected from these raised and depressed portions may undergo interference, thereby causing irregularities in the intensity of the glare image and generating high frequency components in the glare image.

The low frequency component removal means 105a, 105b were used to remove low frequency components from the spatial frequency of the two images output from the imaging areas 101a, 101b. Specifically, after taking a two-dimensional Fourier transform of the images to convert the image information into spatial frequencies, the low frequency components equal or lower than 0.067 cycles/pixel were removed, followed by restoring the images using an inverse Fourier transform.

It should be noted while the present working example used 0.067 cycles/pixel to define the low frequency region to be removed from the spatial frequency, the threshold values used for frequency removal are not limited to this value. For instance, as described above, glare image components can be removed in a reliable manner by setting a frequency higher than this frequency as the threshold value.

Moreover, while in the present working example the low frequency components were removed from a two-dimensional spatial frequency of the image information, low frequency components also may be removed from a one-dimensional spatial frequency in the direction of the baseline of the lenses 100a, 100b, in which the parallax is generated (i.e. in the direction of parallax generation), and in this case the influence of the glare image produced by the baffle wall 110 successfully can be removed in the same manner as in Working Example 1.

Furthermore, the methods used to remove the low frequency components are not limited to methods based on the use of Fourier transforms and the low frequency components can be removed by applying a differential filter, a Sobel filter, or a LoG filter, etc. to the image information.

After removing the low frequency components in this manner, the warping and size of the two images were adjusted based on calibration data determined by measurement in advance in order to eliminate the influence of image distortion produced by the aberration and defocusing of the lenses 100a, 100b.

After that, the amount of parallax was determined by comparing the two images. Specifically, one of the two images (reference image), which had been obtained from the imaging area 101a, was divided into 8 pixel×8 pixel blocks and blocks corresponding to each of the blocks were retrieved from the image (comparison image) obtained from the imaging area 101b, with the amount of parallax determined from the amount of positional shift between the corresponding blocks. At such time, 0.1 pixels was used as a unit of interpolation for interpolating the interpixel intensity of the comparison image.

When an image of the object, which was located at a distance of 1 m, was captured using the imaging apparatus of Working Example 1, the amount of parallax was 4.4 pixels. Based on this, the object distance determined from [Eq. 4] above was 3.75 mm×2.6 mm/(4.4×2.2 µm)=1.01 m. When the object distance was measured in a similar way with a high-intensity object placed outside of, but close to the field angle, the result of the measurement was 1.01 m, i.e. with no errors generated in the distance measurement result.

Furthermore, a single high-quality image that contained no glare images successfully was obtained by comparing the contrast levels of images contained in pairs of mutually corresponding blocks forming part of the two images output from the imaging areas 101a, 101b prior to the removal of the low frequency components, selecting images with a higher level of contrast, and using them for compositing.

Working Example 2

Figure 8:
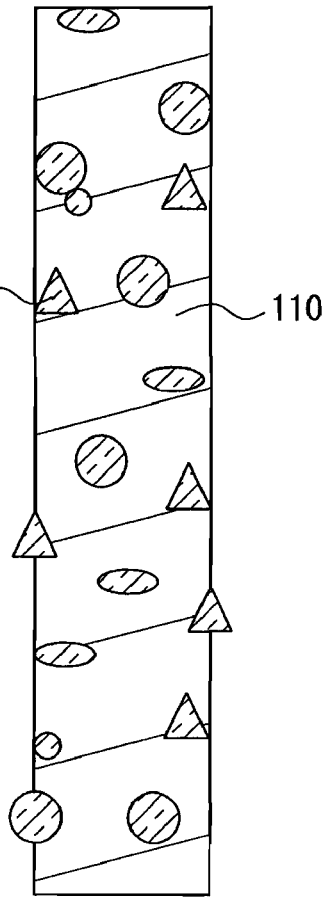
FIG. 8 is a cross-sectional view of the baffle wall used in an imaging apparatus in a second working example of the present invention.

As shown in FIG. 8, Working Example 2 differs from Working Example 1 in that it uses transparent microparticles 500 in the baffle wall 110 as a means for diffusively reflecting light rays. Namely, polycarbonate containing 15% of a glass powder with a diameter of 1 µm to 10 µm was molded in a mold to produce the baffle wall 110. As a result, transparent microparticles 500 were disposed on the surface of the baffle wall 110 in a non-uniform manner. When light rays were incident on such a baffle wall 110, the light was diffusively reflected on the surface of and inside the transparent microparticles 500. As a result, light rays were diffusively reflected from the wall, in the same manner as from the baffle wall 110 of Working Example 1, which was provided with raised and depressed portions, and the high frequency components of the glare images produced by the reflected light were shifted towards low frequency components.

If the shape of the transparent particles 500 is uniform, the scattered light rays may undergo interference, generating regular patterns with high frequency components in the glare images, which is why the shape of the transparent particles 500 is preferably irregular.

It should be noted that while in Working Example 2 the process of molding involved introducing a transparent glass powder into polycarbonate, the methods used for fabricating the baffle wall are not limited to the above-described method. The wall may be fabricated, for instance, by spraying a glass powder onto the surface of a molded, substantially opaque plate-shaped part, or by the lamination of members containing a glass powder. By doing so, the scattering means can be provided only in the vicinity of the surface of the baffle wall, thereby allowing for reliable optical shielding.

In this example, which differs only in the configuration of the baffle wall, the low frequency components of the spatial frequency of the two images output from the imaging areas 101a, 101b (see FIG. 1) were removed, the amount of parallax was determined, and the distance to the object was obtained in the same manner as in Working Example 1. As a result, no errors were generated when the distance to the object was determined even with a high-intensity object placed outside of, but close to the field angle.

Furthermore, a single high-quality image that contained no glare images was obtained successfully by comparing the contrast levels of images contained in pairs of mutually corresponding blocks forming part of the two images output from the imaging areas 101a, 101b prior to the removal of the low frequency components, selecting images with a higher level of contrast, and using them for compositing.

Working Example 3

Working Example 3 differs from Working Examples 1 and 2 in that, as a means for reflecting light rays, the above-described raised and depressed portions were formed on the surface of the baffle wall 110 as "transferred" raised and depressed portions by molding the baffle wall 110 in a mold provided with raised and depressed portions. In Working Example 3, a mold that had a pattern of raised and depressed portions formed thereon by etching was used to mold the baffle wall 110 from a mixed material composed of polycarbonate and carbon. Subsequently, this baffle wall 110 was installed in an imaging apparatus of the same configuration as in Working Example 1. When the scattering characteristic of this baffle wall 110 was measured using the previously described method, it was found that the angle of diffusion for laser light, whose angle of incidence on the surface of the baffle wall 110 was half the field angle of the imaging apparatus, was 6.37 degrees. Moreover, the diffusion factor of the baffle wall 110 with respect to a light ray passing through the center of the lens and incident on the baffle wall 110 such that the center light ray of the reflected light diffusively reflected from the baffle wall 110 was incident on a location closest to the baffle wall 110 on the peripheral edge of the imaging area, was about 39×. The cutoff resolution frequency of the lenses 100a, 100b was designed to be 2 cycles/pixel, i.e. higher than the cutoff resolution frequency of the CCD. Thus, high frequency components equal to, or higher than $2/39 \approx 0.051$ cycles/pixel in the spatial frequency of the glare image produced by light diffusively reflected from the baffle wall 110 were shifted towards lower frequency components.

It should be noted that while the means used for diffusively reflecting light rays in Working Example 3 was formed on the surface of the baffle wall 110 by subjecting the surface of the mold to etching, the present invention is not limited to this method. The means for diffusively reflecting light rays can be formed on the surface of the baffle wall 110, for instance, by molding the baffle wall 110 in a mold that has undergone sandblasting treatment.

It is preferable for the raised and depressed portions on the surface of the baffle wall 110 to be irregular because if the raised and depressed portions on the surface of the baffle wall 110 are uniform, the light reflected from these raised and depressed portions may undergo interference, thereby causing irregularities in the intensity of the glare image and generating high frequency components in the glare image.

The low frequency component removal means 105a, 105b were used to remove low frequency components from the spatial frequency of the two images output from the imaging areas 101a, 101b. Specifically, after taking a two-dimensional Fourier transform of the images to convert the image information into spatial frequencies, the low frequency components equal to or lower than 0.051 cycles/pixel were removed, followed by restoring the images using an inverse Fourier transform.

It should be noted while the present working example uses 0.051 cycles/pixel to define the low frequency region to be removed from the spatial frequency, the threshold values used for frequency removal are not limited to this value. For instance, as described above, glare image components can be removed in a reliable manner by setting a frequency higher than this frequency as the threshold value.

Moreover, while in the present working example the low frequency components were removed from a two-dimensional spatial frequency of the image information, low frequency components may also be removed from a one-dimensional spatial frequency in the direction of the baseline of the lenses 100a, 100b, in which the parallax is generated (i.e. in the direction of parallax generation), and in such a case the influence of the glare image produced by the baffle wall 110 can be removed successfully in the same manner as in Working Example 3.

Furthermore, the methods used to remove the low frequency components are not limited to methods based on the use of Fourier transforms, and the low frequency components can be removed by applying a differential filter, a Sobel filter, or a LoG filter, etc. to the image information.

After removing the low frequency components in this manner, the warping and size of the two images were adjusted based on calibration data determined by measurement in advance in order to eliminate the influence of image distortion produced by the aberration and defocusing of the lenses 100a, 100b.

After that, the amount of parallax was determined by comparing the two images. Specifically, one of the two images (reference image), which had been obtained from the imaging area 105a, was divided into 8 pixel×8 pixel blocks and blocks corresponding to each of the blocks were retrieved from the image (comparison image) obtained from the imaging area 105b, with the amount of parallax determined from the amount of positional shift between the corresponding blocks. At such time, 0.1 pixels was used as the unit of interpolation for interpolating the interpixel intensity of the comparison image.

When an image of the object, which was located at a distance of 1 m, was captured using the imaging apparatus of Working Example 3, the amount of parallax was 4.4 pixels. Based on this, the object distance determined from [Eq. 4] above was $3.75 \text{ mm} \times 2.6 \text{ mm}/(4.4 \times 2.2 \text{ μm}) = 1.01$ m. When the object distance was measured in a similar way with a high-intensity object placed outside of, but close to the field angle, the result of the measurement was 1.01 m, i.e. with no errors generated in the distance measurement result.

Furthermore, a single high-quality image that contained no glare images was obtained successfully by comparing the contrast levels of images contained in pairs of mutually corresponding blocks forming part of the two images output from the imaging areas 101a, 101b prior to the removal of the low frequency components, selecting images with a higher level of contrast, and using them for compositing.

Working Example 4

Figure 9A:
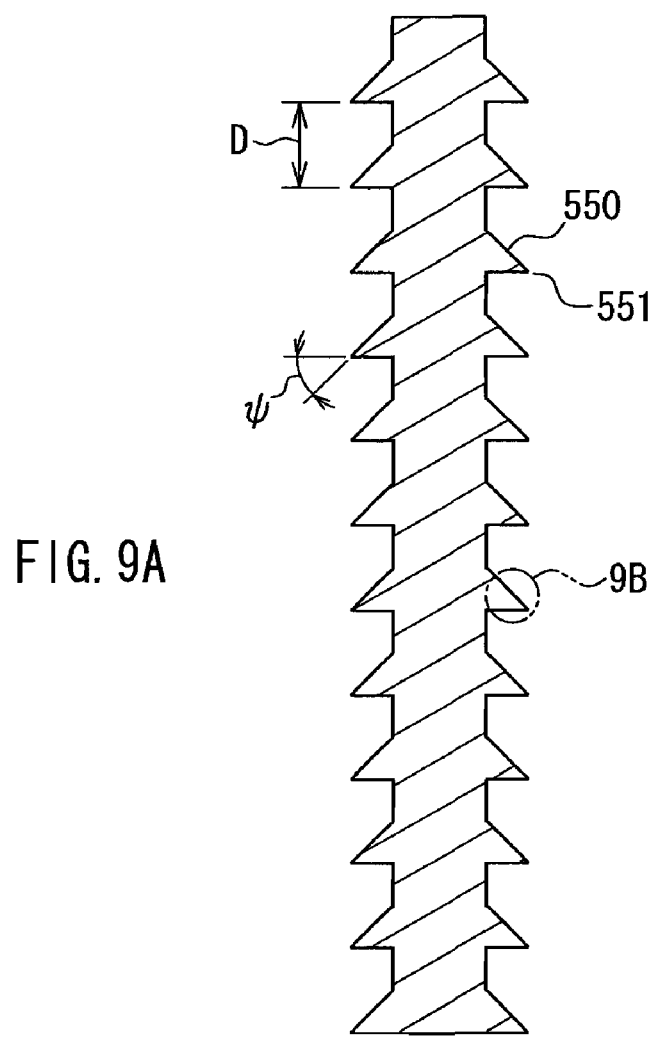
FIG. 9A is a cross-sectional view of a baffle wall used in an imaging apparatus in a fourth working example of the present invention.
Figure 9B:
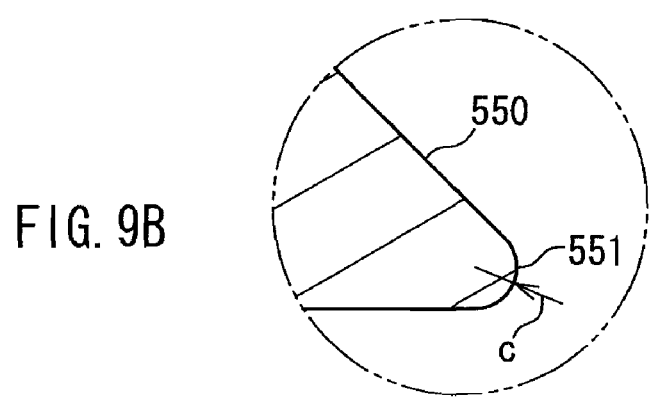
FIG. 9B is an enlarged cross-sectional view of the portion 9B of FIG. 9A.
Figure 10:
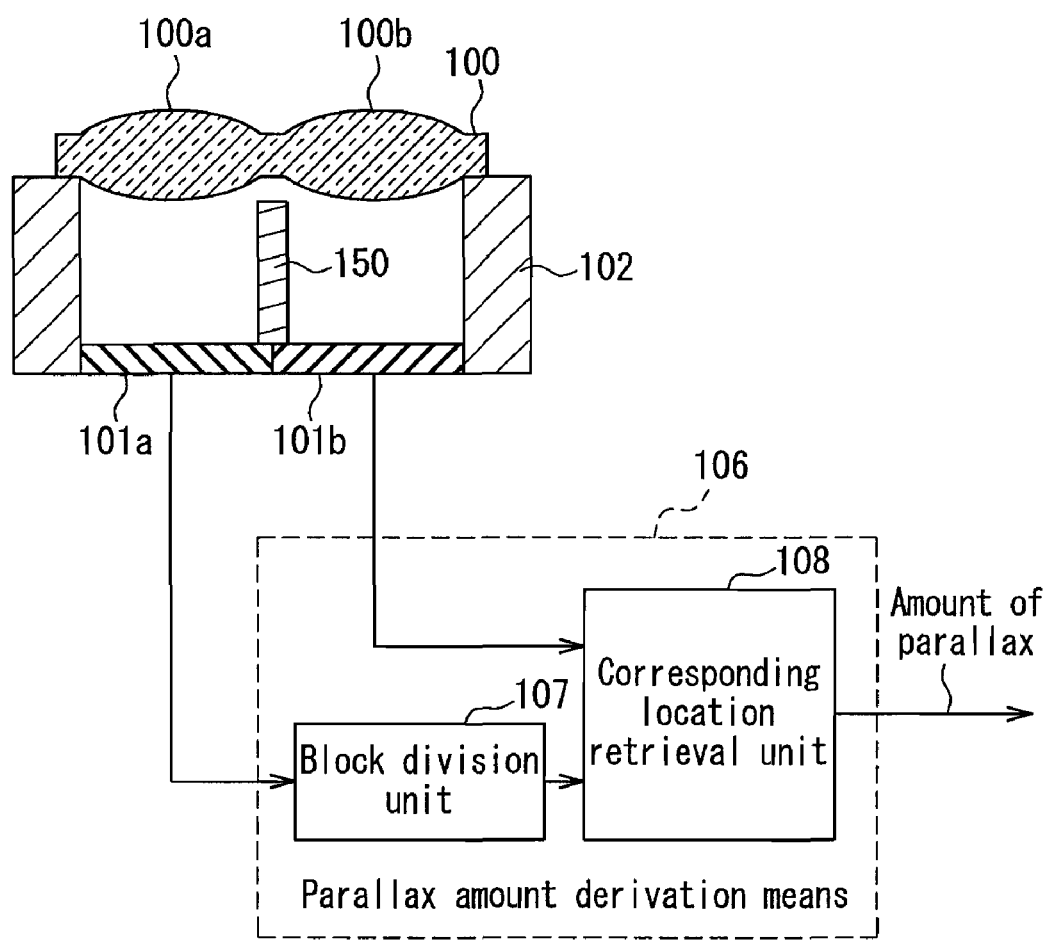
FIG. 10 is a diagram illustrating the overall configuration of a conventional compound eye type imaging apparatus.

FIG. 9A is a cross-sectional view of the baffle wall 110 used in Working Example 4, and FIG. 9B is an enlarged cross-sectional view of portion 9B of FIG. 9A. Working Example 4 differs from Working Examples 1 to 3 in that, as shown in FIG. 9A, along with providing multiple surfaces 550 inclined towards the lens array 100 (at the top of FIG. 9A) on the surface of the baffle wall 110, curvature is imparted to the distal edges 551 of the inclined surfaces 550 to make them substantially cylindrical in shape. The pitch D, with which the multiple inclined surfaces 550 are disposed in the vertical direction, is about 100 μm, the angle of inclination ψ of the inclined surfaces 550 with respect to the horizontal direction is about 30 degrees, and the curvature radius C of the distal edges 551 of the inclined surfaces 550 is about 5 μm. This baffle wall 110 was obtained by injection molding of a mixed material composed of polycarbonate and a carbon filler. Most of the light that passed through the lenses 100a, 100b and was incident on the inclined surfaces 550 was reflected towards the upper portion of FIG. 9A. Moreover, the light that was incident on the distal edges 551 of the inclined surfaces 550 was diffusively reflected by the curved surfaces of the distal edges 551. Therefore, in comparison with the baffle wall of Working Example 1, which had raised and depressed portions provided on its surface, the baffle wall of Working Example 4 was capable of minimizing the amount of light reflected towards the CCD.

The above-described baffle wall 110 of Working Example 4 was installed in an imaging apparatus of the same configuration as in Working Example 1. When the scattering characteristic of this baffle wall 110 was measured using the previously described method, it was found that the angle of diffusion for laser light, whose angle of incidence on the surface of the baffle wall 110 was half the field angle of the imaging apparatus, was 37.35 degrees. Furthermore, the diffusion factor of the baffle wall 110 with respect to a light ray passing through the center of the lens and incident on the baffle wall 110 such that the center light ray of the reflected light diffusively reflected from the baffle wall 110 was incident on a location closest to the baffle wall 110 on the peripheral edge of the imaging area, was about 264×. The cutoff resolution frequency of the lenses 100a, 100b was designed to be 2 cycles/pixel, i.e. higher than the cutoff resolution frequency of the CCD. Thus, high frequency components equal to, or higher than 2/264≈0.0076 cycles/pixel in the spatial frequency of the glare image produced by light diffusively reflected from the baffle wall 110 were shifted towards lower frequency components.

The low frequency component removal means 105a, 105b were used to remove low frequency components from the spatial frequency of the two images output from the imaging areas 101a, 101b. Specifically, after taking a two-dimensional Fourier transform of the images to convert the image information into spatial frequencies, the low frequency components equal to or lower than 0.0076 cycles/pixels were removed, followed by restoring the images using an inverse Fourier transform.

It should be noted while the present working example uses 0.0076 cycles/pixel to define the low frequency region to be removed from the spatial frequency, the threshold values used for frequency removal are not limited to this value. For instance, as described above, glare image components can be removed in a reliable manner by setting a frequency higher than this frequency as the threshold value.

Moreover, while in the present working example the low frequency components were removed from a two-dimensional spatial frequency of the image information, low frequency components also may be removed from a one-dimensional spatial frequency in the direction of the baseline of the lenses 100a, 100b, in which the parallax is generated (i.e. in the direction of parallax generation), and in such a case the influence of the glare image produced by the baffle wall 110 can be removed successfully in the same manner as in Working Example 4.

Furthermore, the methods used to remove the low frequency components are not limited to methods based on the use of Fourier transforms, and the low frequency components can be removed by applying a differential filter, a Sobel filter, or a LoG filter, etc. to the image information.

After removing the low frequency components in this manner, the warping and size of the two images were adjusted based on calibration data determined by measurement in advance in order to eliminate the influence of image distortion produced by the aberration and defocusing of the lenses 100a, 100b.

After that, the amount of parallax was determined by comparing these two images. Specifically, one of the two images (reference image), which had been obtained from the imaging area 105a, was divided into 8 pixel×8 pixel blocks and blocks corresponding to each of the blocks were retrieved from the image (comparison image) obtained from the imaging area 105b, with the amount of parallax determined from the amount of positional shift between the corresponding blocks. At such time, 0.1 pixels was used as the unit of interpolation for interpolating the interpixel intensity of the comparison image.

When an image of the object, which was located at a distance of 1 m, was captured using the imaging apparatus of Working Example 4, the amount of parallax was 4.4 pixels. Based on this, the object distance determined from [Eq. 4] above was 3.75 mm×2.6 mm/(4.4×2.2 µm)=1.01 m. When the object distance was measured in a similar way with a high-intensity object placed outside of, but close to the field angle, the result of the measurement was 1.01 m, i.e. with no errors generated in the distance measurement result.

Furthermore, a single high-quality image that contained no glare images was obtained successfully by comparing the contrast levels of images contained in pairs of mutually corresponding blocks forming part of the two images output from the imaging areas 101a, 101b prior to the removal of the low frequency components, selecting images with a higher level of contrast, and using them for compositing.

It should be noted that means other than the means described in Working Examples 1-4 can be used as means for diffusively reflecting light rays. For instance, a light-scattering sheet (e.g. "Lumisty", a registered trademark of Sumitomo Chemical Co., Ltd.), etc. used for selectively scattering incident light whose angle of incidence is within a specific angle range, as disclosed in Patent document 3, may be adhered to the surface of the baffle wall. The structure of such a light scattering sheet has a certain distribution of the refractive index in the thickness direction and the sheet possesses functionality for scattering incident light whose angle of incidence is within a specific angle range. When this light-scattering sheet is used, the light-scattering sheet preferably is designed such that light scattering takes place when the angle of the incident light with respect to the surface of the light-scattering sheet is half the field angle of the imaging apparatus. Furthermore, the baffle wall, to which the light-scattering sheet is adhered, is preferably rendered black by the dispersion of carbon etc. therein because this allows for reducing the amount of reflected light.

All of the embodiments and working examples described above are intended merely to illustrate the technical content of the present invention and the present invention, which is not to be construed as being limited to such specific examples, can be carried out in various forms within the scope described in the claims and should be construed in a broad sense.

INDUSTRIAL APPLICABILITY

The present invention allows for implementing a compact, low-profile camera module capable of correctly measuring distances to objects even in the presence of high-intensity objects located outside of the field of view. Accordingly, the present invention, which allows for, for instance, capturing three-dimensional information when applied to digital still cameras or cameras installed in cellular phones and increasing the amount of information obtained from an object when applied to surveillance cameras, cameras installed onboard vehicles, and cameras installed in robots, is useful in improving the accuracy of verification, monitoring, control, etc.

The invention claimed is:

1. A compound eye type imaging apparatus with distance measuring capability comprising:
   a plurality of optical lenses disposed in a substantially coplanar alignment;
   a plurality of imaging areas corresponding to the plurality of optical lenses in a one-to-one relationship;
   a baffle wall for preventing light rays that pass through one optical lens among the plurality of optical lenses from being incident on imaging areas that do not correspond to said one optical lens; and
   means for determining the amount of parallax by comparing a plurality of images captured in the plurality of imaging areas,
   wherein the baffle wall comprises means for diffusively reflecting incident light rays, the imaging apparatus further comprises means for removing low frequency components from the spatial frequencies of the plurality of images captured in the plurality of imaging areas, and the means for determining the amount of parallax determines the amount of parallax by comparing the plurality of images obtained upon removal of the low frequency components by the means for removing low frequency components.

2. The compound eye type imaging apparatus with distance measuring capability according to claim 1, wherein the means for diffusively reflecting the light rays is raised and depressed portions provided on the surface of the baffle wall.

3. The compound eye type imaging apparatus with distance measuring capability according to claim 2, wherein the raised and depressed portions are arranged in an irregular fashion.

4. The compound eye type imaging apparatus with distance measuring capability according to claim 1, wherein the means for diffusively reflecting the light rays is transparent microparticles contained at least near the surface of the baffle wall.

5. The compound eye type imaging apparatus with distance measuring capability according to claim 4, wherein the shape of the transparent microparticles is irregular.

6. The compound eye type imaging apparatus with distance measuring capability according to claim 1, wherein the means for removing the low frequency components removes low frequency components from the spatial frequency in the direction of parallax generation.

7. The compound eye type imaging apparatus with distance measuring capability according to claim 1, wherein the angle of diffusion of the baffle wall with respect to light rays, whose angle relative to the baffle wall is half the field angle of the imaging apparatus, is not less than 5 degrees.

8. The compound eye type imaging apparatus with distance measuring capability according to claim 1, wherein the means for removing the low frequency components removes components of the spatial frequency that are equal to, or lower than, $\beta/\alpha$ of the plurality of captured images, $\alpha$ being the diffusion factor of the baffle wall with respect to a light ray passing through the center of the optical lens and impinging on the baffle wall such that the central light ray of the reflected light diffusively reflected from the baffle wall is incident on a location that is closest to the baffle wall on the peripheral edge of the imaging area, and $\beta$ being the cutoff resolution frequency of the optical lens.

9. The compound eye type imaging apparatus with distance measuring capability according to claim 1, further comprising an illuminating device for illuminating the object, with the brightness of the illumination varied in accordance with the intensity distribution of the object image.

10. The compound eye type imaging apparatus with distance measuring capability according to claim 1, further comprising means for dividing one image among the plurality of images captured in the plurality of imaging areas into a plurality of blocks, means for retrieving blocks respectively corresponding to the plurality of blocks in other images among the plurality of images, and means for obtaining a single composite image from the plurality of images, wherein the means for obtaining a composite image compares the levels of contrast of the plurality of mutually corresponding blocks contained in the plurality of images and selects blocks with a higher level of contrast to yield a composite image.

11. The compound eye type imaging apparatus with distance measuring capability according to claim 10, further comprising a lens barrel for preventing light rays that do not pass through any of the plurality of optical lenses from being incident on any of the plurality of imaging areas, wherein locations, in which light rays emanating from a shared object positioned outside of the field angle are incident on the plurality of imaging areas upon undergoing reflection from the inner surface of the lens barrel or the baffle wall, are mutually different for each of the plurality of imaging areas.

* * * * *